United States Patent
Kunert et al.

(10) Patent No.: US 7,010,941 B2
(45) Date of Patent: *Mar. 14, 2006

(54) COATING OF COOLED DEVICES

(75) Inventors: Christian Kunert, Mainz (DE); Uwe Kolberg, Mainz-Kastel (DE); Werner Kiefer, Mainz (DE); Hildegard Römer, Karben (DE); Volker Ohmstede, Mainz (DE)

(73) Assignee: Schott AG, Mainz (DE)

( * ) Notice: Subject to any disclaimer, the term of this patent is extended or adjusted under 35 U.S.C. 154(b) by 392 days.

This patent is subject to a terminal disclaimer.

(21) Appl. No.: 09/759,314

(22) Filed: Jan. 12, 2001

(65) Prior Publication Data

US 2001/0052306 A1 Dec. 20, 2001

(30) Foreign Application Priority Data

Jan. 19, 2000 (DE) ................................ 100 02 020

(51) Int. Cl.
*C03B 11/12* (2006.01)

(52) U.S. Cl. .................... 65/356; 65/29.19; 65/355; 65/374.11; 65/135.2; 65/137; 65/144.4; 65/29.21; 366/144; 366/147; 366/279; 165/109.1; 480/80; 106/38.2; 266/235; 266/233; 373/156; 373/153

(58) Field of Classification Search ............ 65/29.19, 65/356, 355, 374.11, 135.2, 135.3, 137, 136.4, 65/178, 134.4, 29.21; 366/144, 147, 279; 165/109.1; 432/80; 266/235, 233; 106/38.2; 373/156, 153

See application file for complete search history.

(56) References Cited

U.S. PATENT DOCUMENTS

| | | | |
|---|---|---|---|
| 3,498,778 A * | 3/1970 | Hynd ........................ 65/356 |
| 4,122,718 A * | 10/1978 | Gustafson | |
| 4,342,803 A | 8/1982 | Stengle, Jr. ................ 428/131 |
| 4,420,876 A | 12/1983 | McDermott ................. 29/611 |
| 4,471,488 A | 9/1984 | Reboux | |
| 4,579,719 A | 4/1986 | Keller ........................ 422/250 |
| 4,660,212 A | 4/1987 | Boen et al. ................. 373/156 |
| 4,923,508 A | 5/1990 | Diehm et al. | |
| 5,011,562 A * | 4/1991 | Barnoach .................... 156/498 |
| 5,283,805 A | 2/1994 | Kawano et al. | |
| 5,367,532 A | 11/1994 | Boen et al. | |
| 6,109,062 A * | 8/2000 | Richards ..................... 65/356 |
| 6,334,337 B1 * | 1/2002 | Macedo et al. ............ 65/135.2 |
| 2003/0048829 A1 | 3/2003 | Kunet et al. | |

FOREIGN PATENT DOCUMENTS

| | | |
|---|---|---|
| DE | 32 29 461 | 2/1984 |
| DE | 41 42 245 | 6/1993 |
| DE | 19939782 | 5/2001 |
| EP | 0079266 | 5/1983 |
| EP | 0528025 | 2/1993 |
| FR | 1.306.851 | 10/1962 |
| GB | 794317 | 4/1958 |
| GB | 977546 | 12/1964 |
| GB | 1221909 | 2/1971 |
| WO | WO 98/38136 | 9/1998 |
| WO | WO 01/14262 | 3/2001 |
| WO | WO01/14262 | 3/2001 |
| WO | WO 01/14265 | 3/2001 |
| WO | WO01/14265 | 3/2001 |

OTHER PUBLICATIONS

Office Action with English Language translation of German Patent Application No. 100 02 020.8 dated Aug. 3, 2000.

* cited by examiner

*Primary Examiner*—Mark Halpern
(74) *Attorney, Agent, or Firm*—Baker & Daniels

(57) ABSTRACT

A structural component for a device for the treatment of melts, especially of glass melts, having a base body of metal or of a metal alloy and a cooling system in which a cooling medium is led through the structural component for the leading-off of heat. The base body is provided with a coating of a material the decomposition temperature of which lies below the temperature of the melt, and the cooling system is designed and arranged in such manner that the temperature of the boundary layer of the melt that immediately surrounds the structural component lies below the decomposition temperature of the coating material.

29 Claims, No Drawings

COATING OF COOLED DEVICES

This application seeks foreign priority over application 100 02 020.3 filed in Germany on 19 Jan. 2000.

The invention relates to the treatment of melts, especially of glass melts. The invention relates above all to structural components that are used here.

For the treatment of glass melts, tanks or crucibles are used both for the production of a melt and also for its refining. After the refining process there is engaged a homogenization step. In all these treatment steps structural components of the most diverse nature are brought into the liquid melt. In the fusion process there are, for example, electrodes with which thermal energy is introduced into the melt by reason of the Joule effect. In the refining, tubes are brought into the melt for the introduction of gases. In the homogenizing process, an agitator rotates in the melt.

Such structural components plunging into the melt are constructed with the use of noble metals or of noble metal alloys. The temperature here is a critical magnitude. At high temperatures, namely, the solidity of noble metals decreases. Furthermore, the danger of corrosive attack of the noble metal by the melt increases. As a remedy the structural components mentioned are provided with a cooling system in which a cooling medium is led through the interior of the structural component. Depending on the requirements, there comes into consideration as the cooling medium oil, water, air, or other substances.

The cooling can bring about unfavorable side effects. Thus, in many places in which the cooling is especially intensive, aggressive substances that are contained in the melt may condense and lead to corrosion. It is a known practice, for example, to lead water-cooled cooper pipes through a burner-heated upper furnace space. In the upper furnace space sulphur-containing exhaust gases are present which can condense and lead to corrosion. The useful life of such copper pipes amounts, therefore, maximally to 6 months.

Moreover, the following may occur. In the upper furnace space there are present substances that can exist only at a high temperature. Starting from certain temperatures that are generated by the cooling, and onward, these substances or their decomposition products crystallize out. After a certain time crystals fall into the melt and render this unusable. In the upper furnace space there is present, furthermore, water vapor. This can condense on the cooled surfaces. Hereby there arises locally the danger of electrical short circuits.

Underlying the invention is the problem of forming metal structural components of the type mentioned for devices used in the treatment of melts, especially of glass melts, in such manner that they can be led into the gas space above the melt or through this gas space into the melt, without there occurring any corrosion of the metal surfaces or any formation of crystals, and that the danger of electrical short circuits by condensing substances is minimized or precluded.

For the solution of this problem, the structural components are coated according to the invention with a material the decomposition temperature of which lies below the temperature of the melt. Preferably, such a material consists of plastic.

The thought of using as a coating material a material the melting or decomposition temperature of which lies below the prevailing environmental temperature must at first glance appear absurd. The inventors, however, have perceived the following: The cooling of the structural component concerned causes the contact temperature between the coating material on the one hand, and the surrounding melt on the other hand, to remain below the decomposition or fusion temperature of the coating material. In tests it has proved, surprisingly, that even plastics coatings with a decomposition temperature of below 300° C. withstand use in vessels where temperatures exceed 1300° C. A precondition is the correct attuning between the cooling on the one hand and the coating on the other hand. In detail this means that the parameters of the cooling throughput and the temperatures of the cooling medium, the thermal conductivity, the wall thickness, the construction as well as the parameters of the coating—coating thickness, thermal conductivity—must be correctly dimensioned. As a coating material there come into consideration low-melting metals, alloys as well as plastics.

For the suppression of condensation and crystallization in the gas space, with simultaneous electrical insulation, plastics have proved especially well-suited. Especially halogen-containing, comparatively temperature-stable plastics such as Teflon (PTFE) or perfluoro-alkoxy (PFA), plastics with decomposition temperatures of ca. 300° C. have proved satisfactory. With efficient water cooling and well thermo-conductive carrier materials, however, there are also usable cheaper, lower melting plastics such as polypropylene (PP), polyethylene (PE) or polyvinyl chloride (PVC).

The coating thickness may be less than 1 mm, may be between $20\,\mu$ and $250\,\mu$ and preferably between $40\,\mu$ and $200\,\mu$. The base body of the structural component may be made of copper, platinum, steel or alloys of the metals. One example of a structural component is an electrode holder.

The effect of the suppression of condensation and crystallization is based on certain phenomena: on the one hand by the thermal insulation effect of the plastic, the surface temperature of the metal-plastic bonding system is brought to values above 100° C., so that water (as a solvent for all other substances contained in the atmosphere) condenses more.

On the other hand, the sealing materials used are not moistened by possible condensates. Even if small droplets form, these run off very rapidly. A crystallization is effectively suppressed through the fact that potentially separating substances do not find any suitable atomic netting or grid for growth on plastics. Since the plastics used are electrically non-conductive, a plastic coating obviates or minimizes the danger of short circuits or of electric arcs.

The advantages of the invention, therefore, can be summarized as follows:

By use of the invention it is ensured that cooled structural components that are present either in a hot melt or in the gas space above it are dependably protected against corrosion. Simultaneously, the cooling system solves the problem posed, inasmuch as it provides that the structural component concerned is itself protected against excessively high temperatures.

Further, there is dependably prevented the possibility that crystals will form, which disadvantageously impair the process.

Finally, a dependable electric insulation is brought about and therewith there is avoided the danger of electrical short circuits.

EXAMPLES OF EXECUTION

Example 1

In the production of highly pure glasses for fiber optical wave guides, a rotating PFA-coated agitator was used for the homogenization. The agitator consisted of a permeable copper tube corresponding to an inverted T, which was coated externally with a 250 μ-thick PFA layer and through which the cooling water was made to flow. As a result of the cooling a hardened glass layer developed on the portion of the agitator immersed in the melt. Even after being in use for several hours, the coating remained preserved; a green coloration of adherent glass characteristic for a cooper contamination did not appear. On the portion of the agitator that was above the melt, only very slight condensation or evaporating glass components appeared. Tests with water-cooled copper structural components with thinner PTFE layers were likewise successful.

Example 2

For the introduction of chlorine gas into laser glass melts, intended to lower their OH-content, there was used a water-cooled double tube of platinum with a 150 μ-thick PFA outer coating. On the immersed portion of the tube there was likewise formed a hardened glass layer; the plastic layer was not attacked. On the portion lying above the melt, where with the use of uncoated introduction tubes a larger number of crystals formed, no crystals were found.

In the tests carried out until now, the work was done with glass melts. The use of a device according to the invention in contact with other oxide-, salt-, or metal melts, however, is likewise directly possible with suitable layout of the cooling system and selection of the coating.

The layer thickness of the coating material must not be too great. The reason for this is as follows: plastic is, as is well known, a heat insulator and thus it hampers the heat flow from the one side of the coating to the other. If the layer is too thick, then this can lead to the result that from the melt that is present in the contact zone with the plastic, insufficient heat is drawn off by the cooling medium flowing in the metallic object. The contact zone then takes on temperatures that lie above the decomposition temperature of the plastic.

The invention claimed is:

1. A structural component for a device for the treatment of glass melts, comprising:
   a base body of metal or a metal alloy with a cooling system in which a cooling medium is led through for the leading-off of heat through the structural component;
   the base body being provided with a coating of plastic material the melt temperature of which lies below the melt temperature of the glass melt;
   the cooling system being designed and arranged in such a manner that the temperature of the boundary layer of a glass melt that directly surrounds the structural component in use lies below the melt temperature of the coating of plastic material;
   wherein the plastic material is halogen-containing.

2. Structural component according to claim 1, wherein the coating thickness is less than 1 mm.

3. Structural component according to claim 1, wherein the base body consists essentially of copper, platinum, steel or aluminum, or of alloys of these metals.

4. Structural component according to claim 1, wherein the structural component it is an agitator for the homogenization of glass melts.

5. A structural component for a device for the treatment of glass melts, comprising:
   a base body of metal or a metal alloy with a cooling system in which a cooling medium is led through for the leading-off of heat through the structural component;
   the base body being provided with a coating of plastic material the melt temperature of which lies below the melt temperature of the glass melt;
   the cooling system being designed and arranged in such a manner that the temperature of the boundary layer of a glass melt that directly surrounds the structural component in use lies below the melt temperature of the coating of plastic material;
   wherein the coating thickness is less than 1 mm.

6. Structural component according to claim 5, characterized in that the coating thickness lies between 20 μ and 250μ.

7. Structural component according to claim 6, wherein the base body consists essentially of copper, platinum, steel or aluminum, or of alloys of these metals.

8. Structural component according to claim 6, wherein the structural component is an agitator for the homogenization of glass melts.

9. Structural component according to claim 5, wherein the base body consists essentially of copper, platinum, steel or aluminum, or of alloys of these metals.

10. Structural component according to claim 5, wherein the structural component is an agitator for the homogenization of glass melts.

11. A structural component for a device for the treatment of glass melts, comprising:
    a base body of metal or a metal alloy with a cooling system in which a cooling medium is led through for the leading-off of heat through the structural component;
    the base body being provided with a coating of plastic material the melt temperature of which lies below the melt temperature of the glass melt;
    the cooling system being designed and arranged in such a manner that the temperature of the boundary layer of a glass melt that directly surrounds the structural component in use lies below the melt temperature of the coating of plastic material;
    wherein the base body consists essentially of copper, platinum, steel, or of alloys of these metals.

12. A structural component for a device for the treatment of glass melts, comprising:
    a base body of metal or a metal alloy with a cooling system in which a cooling medium is led through for the leading-off of heat through the structural component;
    the base body being provided with a coating of plastic material the melt temperature of which lies below the melt temperature of the glass melt;
    the cooling system being designed and arranged in such a manner that the temperature of the boundary layer of a glass melt that directly surrounds the structural component in use lies below the melt temperature of the coating of plastic material;
    wherein the structural component is an agitator for the homogenization of glass melts.

13. A structural component for a device for the treatment of glass melts, comprising:
    a base body of metal or a metal alloy with a cooling system in which a cooling medium is led through for the leading-off of heat through the structural component;

the base body being provided with a coating of plastic material the melt temperature of which lies below the melt temperature of the glass melt;

the cooling system being designed and arranged in such a manner that the temperature of the boundary layer of a glass melt that directly surrounds the structural component in use lies below the melt temperature of the coating of plastic material;

wherein the structural component is a duct for the introduction of gases into the glass melt.

14. A structural component for a device for the treatment of glass melts, comprising:

a base body of metal or a metal alloy with a cooling system in which a cooling medium is led through for the leading-off of heat through the structural component;

the base body being provided with a coating of plastic material the melt temperature of which lies below the melt temperature of the glass melt;

the cooling system being designed and arranged in such a manner that the temperature of the boundary layer of a glass melt that directly surrounds the structural component in use lies below the melt temperature of the coating of plastic material;

wherein the structural component is an electrode holder.

15. A structural component for a device for the treatment of glass melts, said structural component being disposed in a glass melt or in a gas space directly above a glass melt, said structural component comprising:

a base body of metal or a metal alloy with a cooling system in which a cooling medium is led through for the leading-off of heat through the structural component;

the base body being provided with a coating of plastic material the melt temperature of which lies below the melt temperature of the glass melt;

the cooling system being designed and arranged in such a manner that the temperature of the boundary layer of the glass melt that directly surrounds the structural component lies below the melt temperature of the coating of plastic material.

16. A structural component for a device for the treatment of glass melts, said structural component being disposed in a glass melt or in a gas space directly above a glass melt, said structural component comprising:

a base body of metal or a metal alloy with a cooling system in which a cooling medium is led through for the leading-off of heat through the structural component;

the base body being provided with a coating of plastic material the melt temperature of which lies below the melt temperature of the glass melt;

the cooling system being designed and arranged in such a manner that the temperature of the boundary layer of the glass melt that directly surrounds the structural component lies below the melt temperature of the coating of plastic material;

wherein the plastic material is halogen-containing.

17. Structural component according to claim 16, wherein the coating thickness is less than 1 mm.

18. Structural component according to claim 16, wherein the base body consists essentially of copper, platinum, steel or aluminum, or of alloys of these metals.

19. Structural component according to claim 16, wherein the structural component it is an agitator for the homogenization of the glass melt.

20. A structural component for a device for the treatment of glass melts, said structural component being disposed in a glass melt or in a gas space directly above a glass melt, said structural component comprising:

a base body of metal or a metal alloy with a cooling system in which a cooling medium is led through for the leading-off of heat through the structural component;

the base body being provided with a coating of plastic material the melt temperature of which lies below the melt temperature of the glass melt;

the cooling system being designed and arranged in such a manner that the temperature of the boundary layer of the glass melt that directly surrounds the structural component lies below the melt temperature of the coating of plastic material;

wherein the coating thickness is less than 1 mm.

21. Structural component according to claim 20, characterized in that the coating thickness lies between 20 $\mu$ and 250 $\mu$.

22. Structural component according to claim 21, wherein the base body consists essentially of copper, platinum, steel or aluminum, or of alloys of these metals.

23. Structural component according to claim 21, wherein the structural component is an agitator for the homogenization of the glass melt.

24. Structural component according to claim 20, wherein the base body consists essentially of copper, platinum, steel or aluminum, or of alloys of these metals.

25. Structural component according to claim 20, wherein the structural component is an agitator for the homogenization of the glass melt.

26. A structural component for a device for the treatment of glass melts, said structural component being disposed in a glass melt or in a gas space directly above a glass melt, said structural component comprising:

a base body of metal or a metal alloy with a cooling system in which a cooling medium is led through for the leading-off of heat through the structural component;

the base body being provided with a coating of plastic material the melt temperature of which lies below the melt temperature of the glass melt;

the cooling system being designed and arranged in such a manner that the temperature of the boundary layer of the glass melt that directly surrounds the structural component lies below the melt temperature of the coating of plastic material;

wherein the base body consists essentially of copper, platinum, steel, or of alloys of these metals.

27. A structural component for a device for the treatment of glass melts, said structural component being disposed in a glass melt or in a gas space directly above a glass melt, said structural component comprising:

a base body of metal or a metal alloy with a cooling system in which a cooling medium is led through for the leading-off of heat through the structural component;

the base body being provided with a coating of plastic material the melt temperature of which lies below the melt temperature of the glass melt;

the cooling system being designed and arranged in such a manner that the temperature of the boundary layer of the glass melt that directly surrounds the structural component lies below the melt temperature of the coating of plastic material;

wherein the structural component is an agitator for the homogenization of glass melts.

28. A structural component for a device for the treatment of glass melts, said structural component being disposed in a glass melt or in a gas space directly above a glass melt, said structural component comprising:
- a base body of metal or a metal alloy with a cooling system in which a cooling medium is led through for the leading-off of heat through the structural component;
- the base body being provided with a coating of plastic material the melt temperature of which lies below the melt temperature of the glass melt;
- the cooling system being designed and arranged in such a manner that the temperature of the boundary layer of the glass melt that directly surrounds the structural component lies below the melt temperature of the coating of plastic material;
- wherein the structural component is a duct for the introduction of gases into the glass melt.

29. A structural component for a device for the treatment of glass melts, said structural component being disposed in a glass melt or in a gas space directly above a glass melt, said structural component comprising:
- a base body of metal or a metal alloy with a cooling system in which a cooling medium is led through for the leading-off of heat through the structural component;
- the base body being provided with a coating of plastic material the melt temperature of which lies below the melt temperature of the glass melt;
- the cooling system being designed and arranged in such a manner that the temperature of the boundary layer of the glass melt that directly surrounds the structural component lies below the melt temperature of the coating of plastic material;
- wherein the structural component is an electrode holder.

* * * * *

UNITED STATES PATENT AND TRADEMARK OFFICE
CERTIFICATE OF CORRECTION

PATENT NO. : 7,010,941 B2 Page 1 of 1
APPLICATION NO. : 09/759314
DATED : March 14, 2006
INVENTOR(S) : Christian Kunert et al.

It is certified that error appears in the above-identified patent and that said Letters Patent is hereby corrected as shown below:

Claim 4, Column 3, Line 64 delete "it".

Claim 19, Column 5, Line 66 delete "it".

Signed and Sealed this

Nineteenth Day of September, 2006

JON W. DUDAS
*Director of the United States Patent and Trademark Office*